(12) United States Patent
Oliver et al.

(10) Patent No.: US 9,959,325 B2
(45) Date of Patent: May 1, 2018

(54) METHOD AND APPARATUS FOR SUPPORTING DISTRIBUTED DEDUCTIVE CLOSURES USING MULTIDIMENSIONAL RESULT CURSORS

(75) Inventors: Ian Justin Oliver, Söderkulla (FI); Ora Lassila, Hollis, NH (US); Mika Juhani Mannermaa, Burlington, MA (US); Sergey Boldyrev, Söderkulla (FI)

(73) Assignee: Nokia Technologies Oy, Espoo (FI)

( * ) Notice: Subject to any disclaimer, the term of this patent is extended or adjusted under 35 U.S.C. 154(b) by 846 days.

(21) Appl. No.: 12/818,867

(22) Filed: Jun. 18, 2010

(65) Prior Publication Data

US 2011/0314002 A1 Dec. 22, 2011

(51) Int. Cl.
G06F 17/30 (2006.01)

(52) U.S. Cl.
CPC .. G06F 17/30545 (2013.01); G06F 17/30592 (2013.01)

(58) Field of Classification Search
CPC ......... G06F 17/30566; G06F 17/30545; G06F 17/30592
USPC ................. 707/722, 769; 717/114
See application file for complete search history.

(56) References Cited

U.S. PATENT DOCUMENTS

| | | | |
|---|---|---|---|
| 5,768,577 A * | 6/1998 | Kleewein et al. | |
| 5,835,904 A | 11/1998 | Vicik et al. | |
| 5,960,426 A * | 9/1999 | Pirahesh et al. | |
| 5,999,179 A | 12/1999 | Kekic et al. | |
| 6,044,216 A * | 3/2000 | Bhargava et al. | 717/114 |
| 6,233,586 B1 * | 5/2001 | Chang et al. | |
| 6,484,163 B1 | 11/2002 | Lawrence et al. | |
| 6,684,207 B1 | 1/2004 | Greenfield et al. | |
| 7,203,678 B1 * | 4/2007 | Petropoulos et al. | 707/775 |
| 7,240,059 B2 | 7/2007 | Bayliss et al. | |
| 7,493,337 B2 * | 2/2009 | Chaudhuri et al. | |
| 7,984,043 B1 * | 7/2011 | Waas | 707/718 |
| 8,180,789 B1 * | 5/2012 | Wasserman et al. | 707/766 |
| 9,064,013 B1 * | 6/2015 | Gay et al. | |
| 2003/0004931 A1 * | 1/2003 | Soetarman et al. | 707/3 |
| 2005/0021505 A1 * | 1/2005 | Bernal et al. | 707/3 |
| 2005/0283466 A1 * | 12/2005 | Dettinger et al. | 707/3 |
| 2006/0074881 A1 | 4/2006 | Vembu et al. | |
| 2006/0235823 A1 * | 10/2006 | Chong et al. | 707/1 |
| 2006/0248093 A1 * | 11/2006 | Lassila | G06F 17/30864 |
| 2007/0143261 A1 * | 6/2007 | Uppala | G06F 17/30445 |
| 2008/0059407 A1 * | 3/2008 | Barsness | G06F 17/30545 |

(Continued)

FOREIGN PATENT DOCUMENTS

EP 2 151 772 A1 2/2010

OTHER PUBLICATIONS

Oracle OLAP. Accessed: Aug. 9, 2010, http://www.oracle.com/technetwork/database/options/olap/index.html, pp. 1-5.

*Primary Examiner* — Taelor Kim
(74) *Attorney, Agent, or Firm* — Alston & Bird LLP

(57) ABSTRACT

A method comprises selecting at least a first data set and a second data set on which to apply a query. The method also comprises causing generating of a first cursor based and a second cursor based on a first application of the query on the first data set and a second cursor based on a second application of the query on the second data set. A third cursor based on a combination of a result set returned by the first cursor and second cursor is then generated in response to the query.

18 Claims, 11 Drawing Sheets

(56) References Cited

U.S. PATENT DOCUMENTS

2008/0147648 A1* 6/2008 Dettinger et al. ............... 707/5
2009/0193006 A1 7/2009 Herrnstadt
2009/0204593 A1 8/2009 Bigby et al.

* cited by examiner

FIG. 4

400 START → 401 SELECTING A FIRST DATA SET AND A SECOND DATA SET ON WHICH TO APPLY A QUERY → 403 GENERATING A FIRST CURSOR BASED ON A FIRST APPLICATION OF THE QUERY ON THE FIRST DATA SET AND A SECOND CURSOR BASED ON A SECOND APPLICATION OF THE QUERY ON THE SECOND DATA SET → 405 GENERATING A THIRD CURSOR BASED ON THE FIRST CURSOR AND THE SECOND CURSOR, WHEREIN THE THIRD CURSOR REPRESENTS A COMBINED RESULT SET FOR THE QUERY → END

METHOD AND APPARATUS FOR SUPPORTING DISTRIBUTED DEDUCTIVE CLOSURES USING MULTIDIMENSIONAL RESULT CURSORS

BACKGROUND

Service providers and device manufacturers (e.g., wireless, cellular, etc.) are continually challenged to deliver value and convenience to consumers by, for example, providing compelling network services. One area of interest has been the development of fast, intelligent services and technologies for performing database querying directly from the device, i.e., for performing web based searches, content fulfillment needs and the like. Oftentimes, databases are configured in a distributed manner, wherein the data or content (e.g., streaming media, text) desired for fulfillment of a query or service request is held in different databases. As such, the databases may be held in different geographic or network locations, which for larger data sets can impede the query process. This problem is further exacerbated when the final query response is dependent upon data sets received from the distributed databases at different times, wherein the final query response computation is delayed until all necessary data arrives.

SOME EXAMPLE EMBODIMENTS

Therefore, there is a need for an approach for enabling result cursors associated with a query request to traverse data sets distributed over one or more databases.

According to one embodiment, a method comprises selecting at least a first data set and a second data set on which to apply a query. The method also comprises causing, at least in part, generating of a first cursor based, at least in part, on a first application of the query on the first data set and a second cursor based, at least in part, on a second application of the query on the second data set, wherein the first cursor and the second cursor point to respective query result sets within the first data set and the second data. The method further comprises generating a third cursor based, at least in part, on the first cursor and the second cursor, wherein the third cursor represents a combined result set for the query.

According to another embodiment, an apparatus comprising at least one processor, and at least one memory including computer program code, the at least one memory and the computer program code configured to, with the at least one processor, cause, at least in part, the apparatus to select at least a first data set and a second data set on which to apply a query. The apparatus is also caused to generate a first cursor based, at least in part, on a first application of the query on the first data set and a second cursor based, at least in part, on a second application of the query on the second data set, wherein the first cursor and the second cursor point to respective query result sets within the first data set and the second data. The apparatus is further caused to generate a third cursor based, at least in part, on the first cursor and the second cursor, wherein the third cursor represents a combined result set for the query.

According to another embodiment, a computer-readable storage medium carrying one or more sequences of one or more instructions which, when executed by one or more processors, cause, at least in part, an apparatus to select at least a first data set and a second data set on which to apply a query. The apparatus is also caused to generate a first cursor based, at least in part, on a first application of the query on the first data set and a second cursor based, at least in part, on a second application of the query on the second data set, wherein the first cursor and the second cursor point to respective query result sets within the first data set and the second data. The apparatus is further caused to generate a third cursor based, at least in part, on the first cursor and the second cursor, wherein the third cursor represents a combined result set for the query.

According to another embodiment, an apparatus comprises means for selecting at least a first data set and a second data set on which to apply a query. The apparatus also comprises means for causing, at least in part, generating of a first cursor based, at least in part, on a first application of the query on the first data set and a second cursor based, at least in part, on a second application of the query on the second data set, wherein the first cursor and the second cursor point to respective query result sets within the first data set and the second data. The apparatus further comprises means for generating a third cursor based, at least in part, on the first cursor and the second cursor, wherein the third cursor represents a combined result set for the query.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 4 is a flowchart depicting a process for supporting querying of data sets distributed over one or more databases, according to one embodiment;

DESCRIPTION OF SOME EMBODIMENTS

Examples of a method, apparatus, and computer program for enabling multi-dimensional result cursors for supporting distributed deductive closure processing are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention. Although various embodiments are described with respect to a mobile device, it is contemplated that the approach described herein may be used with any other device that supports and maintains the detection of context data in association with a user defined context.

Figure 1:
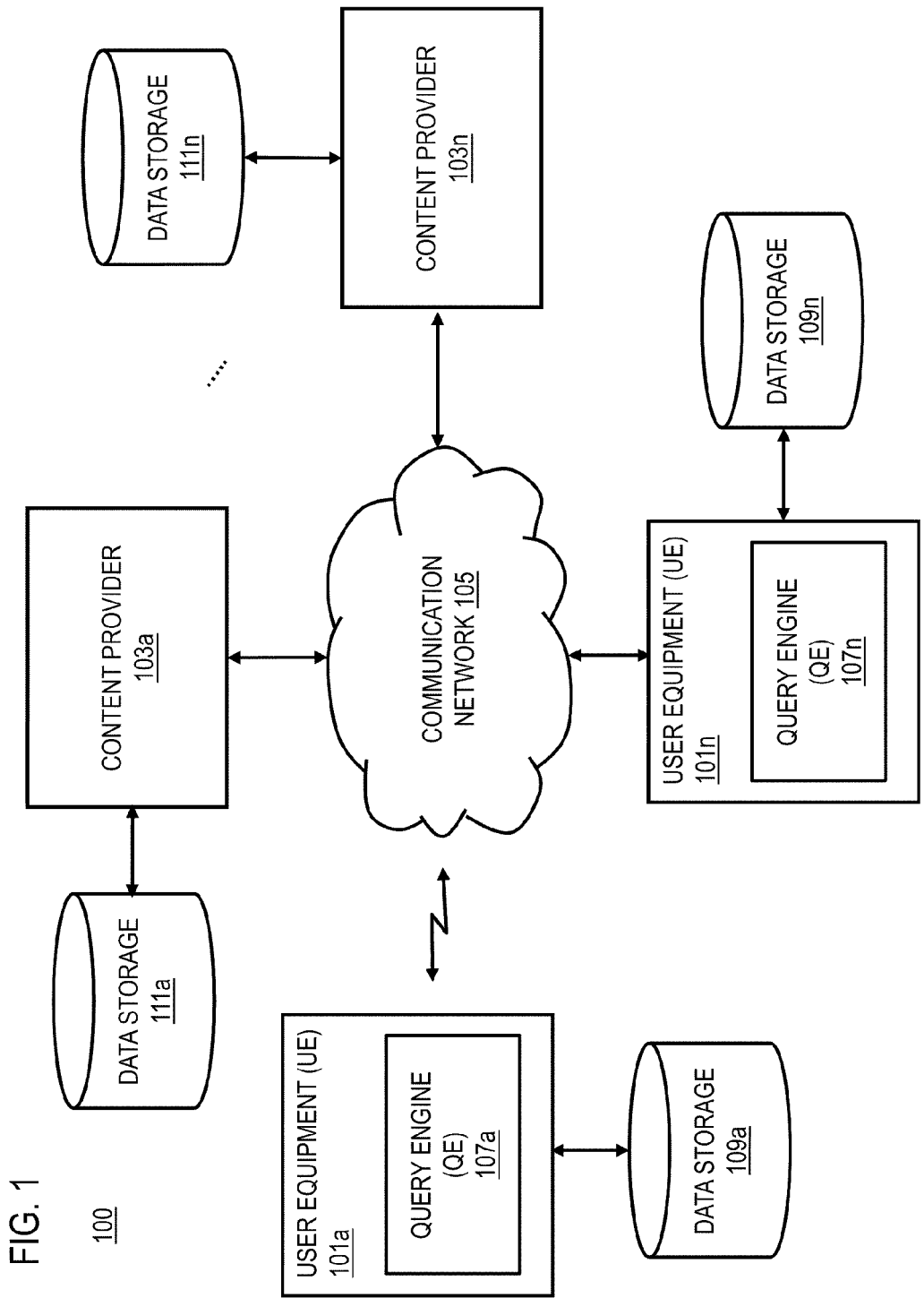
FIG. 1 is a diagram of a system capable of enabling result cursors for supporting querying of data sets distributed over one or more databases, according to one embodiment.

FIG. 1 is a diagram of a system capable of enabling result cursors associated with a query request to traverse data sets distributed over one or more databases, according to one embodiment. As used herein, the term "result cursor" or "cursor" refers to a database control structure (e.g., data structure) for enabling the successive traversal and potential processing of data records in a data set. Furthermore, the cursor may be used to return or render data corresponding to a query result—i.e., data corresponding to, associated with or satisfying the constraints of said query. Generally, cursors provide a mechanism by which a database client sequentially iterates over the records in a database in response to the query, such as in a row-by-row, cell-by-cell or data block-by-block fashion. Using cursors, the client or agent that initiated the query can, at least, GET, PUT and DELETE database records of the data set.

A typical cursor implementation is that of a pointer for referencing specific points within a given data set. In addition, the cursor can be allocated as a multidimensional array/buffer of various sizes for returning data corresponding to the point of reference up to a maximum buffer limit. Hence, a function of the cursor is to yield a result data set containing data of interest respective to the query. Depending on the nature of the query, however, the size of the return data set need not meet the upper limit, but rather only those values from the point of reference to an endpoint of necessity as pertains to the query. A typical cursor implementation can include various data structure elements. For example, the programmatic components of a cursor conforming to the SQL programming language and syntax may include:

DECLARE statements—Declare variables used in the code block for implementing the Cursor SET\SELECT statements—Initialize the variables to a specific value DECLARE CURSOR statement—Populate the cursor with values that will be evaluated NOTE—There are an equal number of variables in the DECLARE <cursor_name> CURSOR FOR statement as there are in the SELECT statement. This could be 1 or many variables and associated columns.

OPEN statement—Open the cursor to begin data processing

FETCH NEXT statements—Assign the specific values from the cursor to the variables WHILE statement—Condition to begin and continue data processing BEGIN . . . END statement—Start and end of the code block NOTE—Based on the data processing multiple BEGIN . . . END statements can be used CLOSE statement—Releases the current data the cursor is operating upon/traversing but permits the cursor to be re-opened DEALLOCATE statement—Destroys the cursor While cursor implementations vary, different procedural or object-oriented programming languages for enabling them may include, but is not limited to Java, Oracle, Virtual Basic, SQL and PL/SQL. The embodiments herein contemplate the use of any type of cursor suitable for operating upon a data set, including multi-dimensional result cursors, which are intended for operating upon data contained in a distributed database environment.

It is noted that a "distributed database environment," as used herein, refers to any database implementation wherein data pertinent to a query is maintained by a plurality of data stores and/or a spread across a plurality of data sets (e.g., a first data, second data set, third data set, or any number of data sets). A basic implementation of a distributed database includes a collection of interconnected nodes (e.g., servers, data storage devices), each node possessing content of various type that it relays upon request to a proxy node acting as a primary point of access to all. More advanced variations of this implementation include database configurations such as, but not limited to, relational database management systems (RDBMS), multi-dimensional database management systems (DBMS) and the like. RDBMS store data in the form of various interrelated tables rather than containing the data as a single data set like in flat-file databases. Multidimensional databases on the other hand can receive data from a variety of relational databases in response to a query and structure the information into categories and sections that can be accessed in a number of different ways. Whereas RDBMS configurations make it easy for computing applications to process individual records, multidimensional DBMS are designed for analyzing large groups of records not necessarily singularly maintained.

Also, as presented herein, "deductive closure" refers to database implementations that utilize logic programming rules to enable more complex data modeling of data sets as they are traversed (processed) in response to a query. Databases that make use of deductive closure techniques structure data according to predefined conceptual schema, such that logical operations map to specific facts, rules or criteria relative to the data (e.g., specified as metadata or data header elements) for enhancing query processing. As a result, database mining and warehousing can be performed to enable logical data inferences or deductions (i.e., concluding of additional facts about the data) to be made based on rules and facts stored in the (deductive) database. Additional facts can be "deduced" about the data set associated with a query based on rules and facts stored in the distributed database. By combining logic programming with relational database methodology, deductive databases support enhanced query processing for very large data sets; especially for information processing on the Web or any other network infrastructure.

As mentioned previously, however, the rate at which data corresponding to a query is retrieved from a plurality of dispersed data sets or database locations (e.g., locally vs. externally) can hamper query response processing. Deductive databases, while useful for performing information extraction and mining, must be able to readily access the data sets or subsets thereof in which to process. This is especially the case in distributed database implementations, wherein logical deductions, assumptions or inferences regarding data can only be made in light of access to all data related to the query. No final result data set can be deduced in response to the query until each of the data sets associated with the query are returned for processing. Another issue affecting the query process is the pace at which a cursor—a defined data retrieval control structure—can traverse the returned data set to identify that which is pertinent to the query. The larger the data set, the more processing iterations required by the cursor in traversing said data set.

Hence, when the data sets associated with and required for fulfillment of a query are distributed or dispersed, the aforementioned data processing techniques associated with deductive databases is jeopardized. Indeed, as data pursuant to a query can be locally maintained (e.g., stored in memory of the requesting client device), cached (e.g., maintained in a virtual data store) or retrievable from a remote/external source to the initiator of the query, the rate at which data sets can be accessed to support distributed deductive closure is critical.

To address this problem, system 100 of FIG. 1 enables a device to generate multiple cursors to operate concurrently for processing of data across interrelated data sets. In particular, the cursors can be generated to support multi-dimensional data processing—i.e., able to meet the processing requirements of multi-dimensional DBMS or online analytical processing (OLAP) devices. The system 100 comprises a user equipment (UE) 101 having connectivity to one or more content providers 103 via a communication network 105. In the example of FIG. 1, the content provider 103 houses one or more data sets in a datastore 111. Data maintained by the content provider 103 can be that of a static nature (e.g., textual data, graphical data) or executable (e.g., streaming media such as audio or video content). Moreover, the content provider may be a hosted server platform, data warehouse, service portal, web server with associated service interface or the like for enabling access to the contents of the datastore 111. Depending on system requirements, the datastore 111 maintained by the content provider 103 may be distributed wherein data sets are dispersed. Alternatively, content providers 103 may communicate with one another for enabling data exchange, therefore facilitating further distributed processing capability. Such an arrangement may be useful for maintaining very large data sets.

In addition to the content provider, the UE 101 may also have connectivity via the communication network 105 to other UE equipment (e.g., another mobile device). While shown identically in the figure, respective UE 101a and 101n need not be implemented identically. Similar to the content provider 103, however, UE 101n maintains a local datastore 109n. In the context of the embodiments herein, UE 101a communicates with the content provider 103 or other devices for the purpose of accessing the datastore in order to fulfill a query request as executed by a query engine (QE) 107. The QE 107 is a computer executable module operable by or in connection with the UE for performing at least one or more of the following among other functions: 1) initiating a query to be performed relative to known data sources, e.g., content providers or other UE 101n; 2) generating one or more cursors for enabling effective gathering of data of interest from the data sources; 3) deductively processing one or more gathered data of interest for achieving resolution to the established query; 4) presenting the resolution to the query. More regarding the functions of the query engine 103 is presented and conveyed with respect to FIG. 2.

Figure 2:
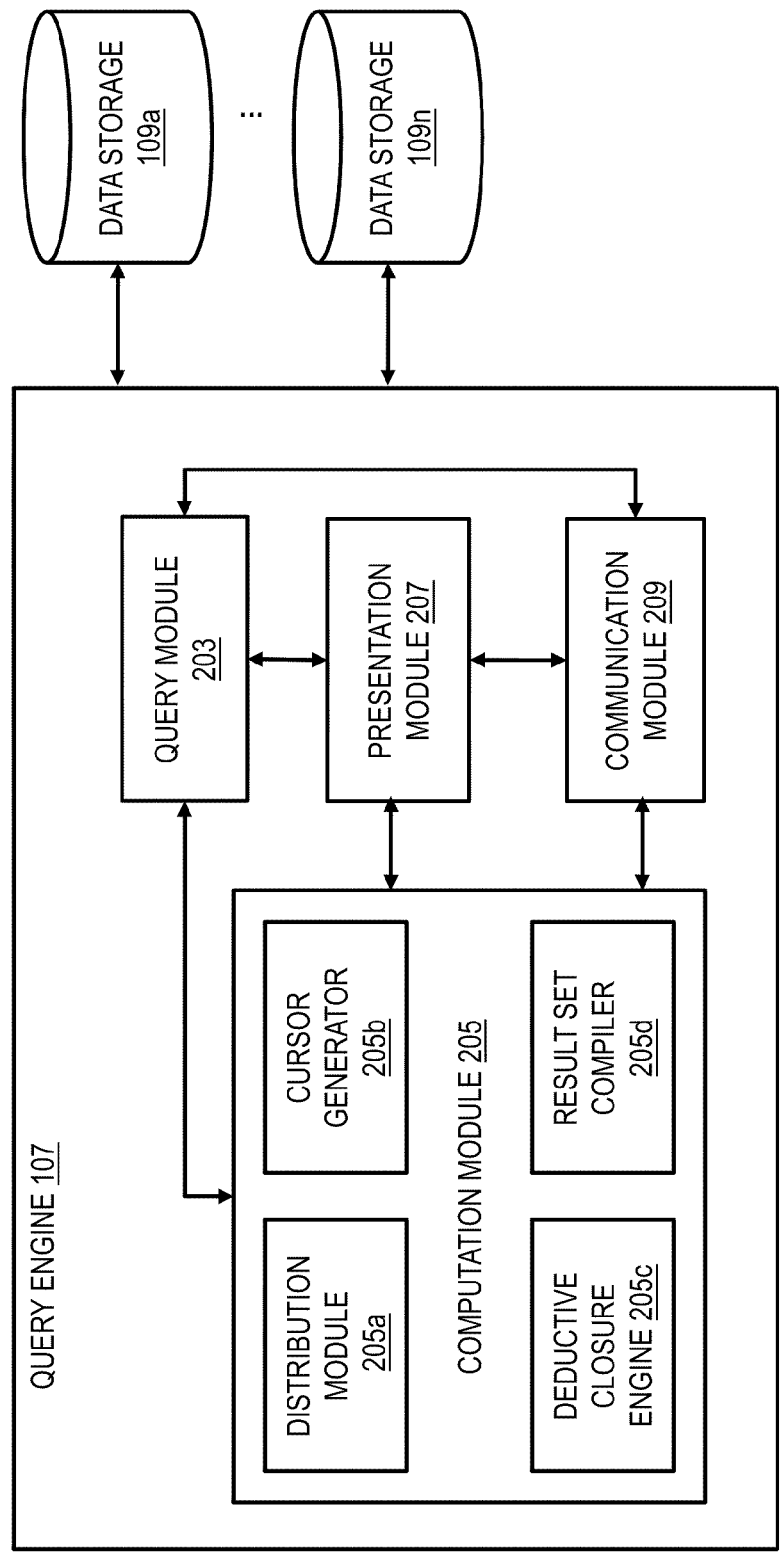
FIG. 2 is a diagram of the components of a query engine for enabling result cursors for supporting querying of data sets distributed over one or more databases, according to one embodiment.

FIG. 2 is a diagram of the components of a query engine (QE) 107 for enabling multi-dimensional result cursors for supporting distributed deductive closure processing, according to one embodiment. By way of example, the query engine 107 includes one or more components for enabling query processing to be performed by the UE 101 using multi-dimensional result cursors. It is contemplated that the functions of these components may be combined in one or more components or performed by other components of equivalent functionality. In this embodiment, the query engine 107 includes a query module 203, a computation module 205, a presentation module 207 and a communication module 209. Still further, the computation module further comprises a distribution module 205a, a cursor generator 205b, a deductive closure engine 205c and a result set compiler 205d.

The query module 203 manages and communicates an input into the UE 101, including communicating a query as requested by a user through direct interaction with the QE 107. The user can specify a particular query by way of a user interface of the query engine 107, as maintained for presentment by the presentation module 207. Likewise, the presentation module 207 can enable presentment of a query result in response to the query module 203. An exemplary approach can be a query service provided by the query module 203 as embedded within a webpage or network interface as provided by the presentation module 207, such as for initiating a web based search.

Alternatively, the query module 203 receives a query provided to it as input by a software application, web service, or other calling executable resident upon or accessible by the UE 101. As such, the query module 203 contemplates either user specified or application/client specified query initiation. Furthermore, the query module can maintain a list of content providers from which to access data sets in response to specific query needs, be the content providers locally accessible as local storage 109a-n or externally accessible by way of a network communication module 209. Exemplary external content providers 103 may include, but is not limited to, large enterprises, web service providers, information hubs, data hosting or content delivery network companies, media companies, news broadcasters, etc. Respective content providers, depending on their specialization, can provide content or data including but not limited to web objects, text, graphics, audio and video files, software, documents, real time media streams and other components of internet delivery.

The query module 203 receives a query input in various forms including pressing a physical button on the UE 101, touching a touch screen panel, scrolling through a dial or a pad, etc. Even further, the query may be specified as textual data or as programmatic instructions depending on the means of initiation of the query. For example, a user may enter a keyword, Boolean constructor or literal search parameter into a search field (e.g., "What is the capital of Spain," perform XYZ computation against data set A through N in response to trigger condition 023) into an input data field presented to the user interface by the query module 203. As another example, an application operable by the UE 103 may execute a call to the query module 203, the call specifying a particular query type to be performed to meet a specific user interaction or application need.

Operating in connection with the query module 203 is the computation module 205. In addition to receiving the query input required to be processed for generating a query result, the computation module also oversees tasks performed by the various other components of the system. This includes facilitating data exchange and storage of returned query result data sets. Furthermore, the computation module 205 executes one or more components that enable the query against known data sources, such as content providers or other devices, to be performed (resolved) responsive to the query. One of the components, a distribution module 205a, executes instructions for modifying the query input as provided across a plurality of databases or data sets associated with the query. The modification may include, but is not limited to, optimizing the query with respect to the data sets required to be queried, distributing the initial query into separate individual queries for use amongst the distributed databases to be queried, etc.

As an example of such modification, a single query Q1 processed initially by the query module 203 and subsequently passed on to the distribution module 205a can be translated across multiple content providers 103, data sources or nodes of a distributed database resulting in separate but related concurrent queries Q1 through Qn being formulated. In this example, n is the number of data sources available for access in resolving the original query, while at least Q1 through Qn operate across the data sources in tandem to maximize query processing speed and efficiency. As yet another example, the distribution module 205a may execute one or more query optimization techniques for modifying the query, wherein the means of data mining is customized for various portions of the distributed database to account for different database capabilities, characteristics or data set types. Various criteria, rules and constraints regarding query results may also be specified (e.g., data must be recent date of publication, most recent version, conform to formatting conditions, meet certain CODEC criteria, etc.) by the query module 203 to affect the behavior of the distribution module 205a.

Figure 3:
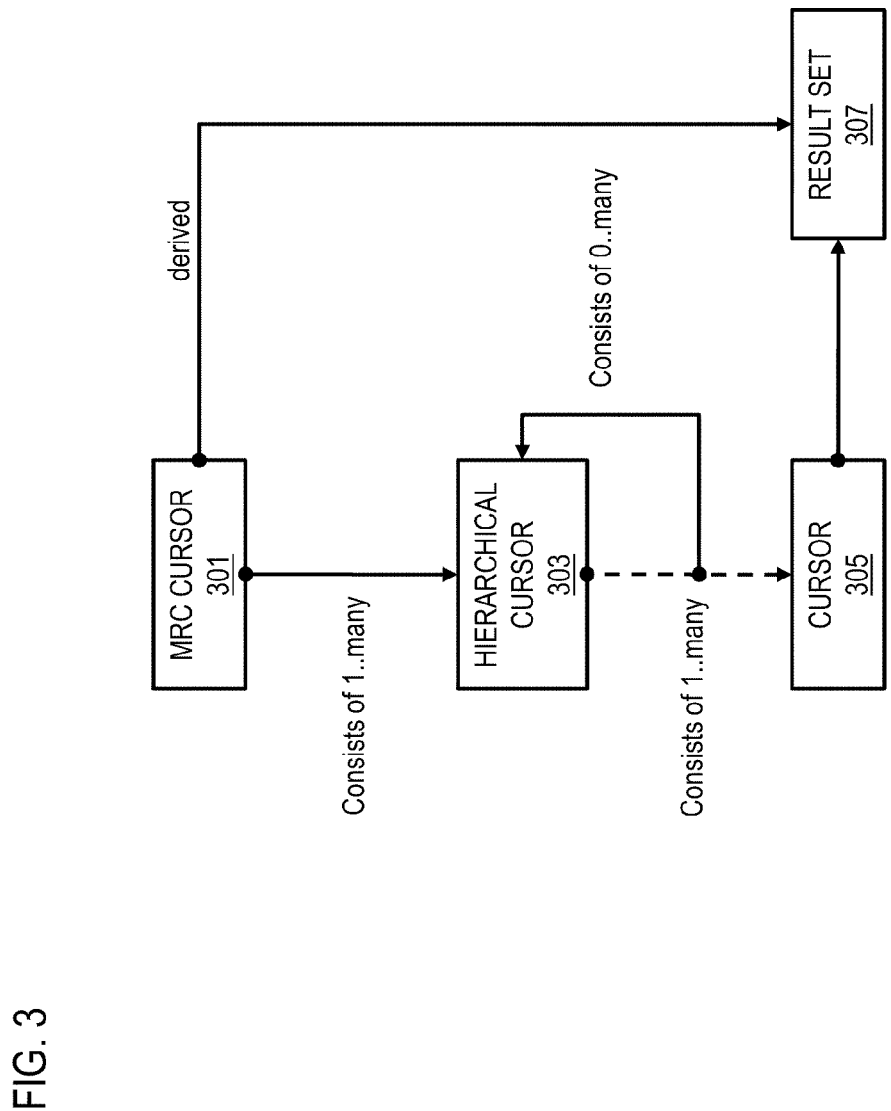
FIG. 3 is a diagram of a multi-dimensional result cursor for supporting querying of data sets distributed over one or more databases, according to one embodiment.

Operating in conjunction with the distribution module 205a is a cursor generator 205b for generating multi-dimensional result (MRC) cursors for processing data sets respective to distributed query requests Q1 through Qn. Objectively, at least one cursor is generated in proportion to each data set and/or database requiring processing due to a query Q1 through Qn. The cursor generator 205b implements cursors to traverse a data set so that its content can be properly processed relative to the query. It also provides information about the current status of a returned result set, the status information indicating but not limited to whether the result set is complete relative to the query constraints, an amount of data of the result set responsive to the query, an extent of available data, a completion time, an error resulting from lack of data access or availability, or a combination thereof. FIG. 3 is a diagram of a multi-dimensional result cursor for supporting the querying of data sets distributed over one or more databases, according to one embodiment. An exemplary depiction of an MRC cursor is shown in FIG. 3

The MRC cursor 301 is a data structure, which itself can contain (or invoke) a plurality of individual cursors for ultimately deriving a corresponding result set 307 required for satisfying a query. The communication model employed in positioning the MRC cursor within a subject data set to be processed (e.g., traversed and analyzed) will impact the number of result sets rendered. This is necessary for the purpose of accounting for system speed, bandwidth capacity, processing speeds, etc., particularly as network communication is required to retrieve each cursor result. As an example, when result sets are derived by the query engine 107 in accord with say, a client-server or hybrid client-server communication model, a fixed or at least expected maximum number of result sets is determined or established at the time of query processing and distribution by the query module 203 and distribution module 205a respectively. On the other hand, in a full peer-to-peer distributed environment (e.g., wherein data is distributed amongst a plurality of UEs 101 having locally stored data), the number of results sets can vary. In accord with this model, the number of possible result sets increase only as larger and more expansive result sets are calculated. Hence, there is a known, computable (finite) upper limit to the number of result sets attainable based on certain processing factors.

For accommodating multi-dimensional database implementations, the MRC cursor 301 may be implemented to construct a hierarchical cursor 303 to accommodate varying subsets of data within a given data set being traversed. Hierarchical cursors 303 act across multiple dimensions (e.g., row or column dimensions) of the data set, referencing a specific point of data within the data set being queried. By operating on subsets of the data set as opposed to the entire data set in absolute terms, memory requirements can be reduced and processing performance enhanced since less data is processed via the subset. As such, hierarchical cursor implementations are called upon by the MRC cursor 301 for distributed or hierarchical data arrangements (e.g., nodes, sub-nodes, data record columns and rows, etc.). Alternatively, basic cursor 305 implementations are called upon by the MRC cursor 301 for traversal and analysis of individual or contained data sets.

Programmatically, the cursor generator 205b spawns a new cursor in response to the structure of the data set to be processed. So, for example, if the database is multidimensional, a multidimensional cursor is spawned. If a data set contains one or more subsets, a hierarchical cursor is spawned at the appropriate level of depth. Additional implementations may also include hierarchically embedded multidimensional cursors for operating upon subsets of data within a multidimensional database. Alternatively, a cursor may spawn its own dependent cursors in response to a particular data processing need. In either case, the cursor generator 205b maintains a list of the cursors generated, including a pointer reference and a running count of cursors generated. As such, cursors can be verified as closed out upon return of a corresponding result set and memory allocation for said cursor can be released.

Operating in conjunction with the cursor generator 205b is a result set compiler 205d, an executable module for compiling the individual result sets returned by respective cursors (hierarchical or otherwise) upon traversal of a data set. In particular, the result set compiler is able to account for result sets returned by each of the cursors spawned by the cursor generator 205b and distributed across multiple databases and/or data sets by the distribution module 205a. Simultaneous compilation of resulting data sets is performed so as to further advance overall query processing rates.

In addition to compiling return data sets, the result set compiler 205d verifies whether or not a known cursor as spawned by the cursor generator 205b (or itself) has actually returned a result set (e.g., closed out). The result set compiler 205d maintains a list identifying a reference for each cursor generated as well as a count of cursors that have been closed out. In addition, it maintains a record of each individual result set, along with a time of derivation and entry to the compilation record. The result set compiler 205d, having communicated with the cursor generator 205b, can determine when all the cursors are complete. Completion of all cursors associated with the query allows, and in some cases triggers, execution of a deductive closure engine 205c. However, in cases where deductive closure is not required, the result set compiler will simply present the final result set to the presentation module 207 for display in conjunction with the query module 203. The data compiled by the result set compiler may optionally be filtered, reduced or enjoined in union such that redundant data between sets is eliminated, processed in accord with a deterministic data model or any other procedure prior to being passed along to the presentation module 207. Regardless, it is noted that simultaneous query execution as facilitated by the distribution module 205a and cursor generator 205b expedites result set retrieval relative to the query in preparation for transitive closure processing.

The deductive closure engine 205c is an executable module for performing deductive closure processing of the result sets returned by the individual cursors 303 and/or 305 of the MRC cursor 301. More specifically, the deductive closure engine 205c applies one or more deductive closures over respective query result sets. As discussed previously, deductive closure processing ensures that a definitive result is arrived at based at least in part on logical rules or criteria associated with the data (e.g., a query completion status, an amount of data responsive to the query, an extent of available data, a completion time, an error resulting from lack of data access or availability, etc.). So, for example, if n result sets are returned to the result set compiler by cursors 1-$n$, the deductive closure engine 205c can further operate upon each result set to derive and generate a final result set based on common or fundamental characteristics amongst each result. This final result set is arrived at based on transitive closure processing of the individual result sets maintained by the result set compiler 205d for each cursor. Generation of the final result set is then provided to the presentation module 207 for rendering the query output to a user interface in conjunction with the query module 203. Alternatively, the presentation module 207 returns a value resulting from computational processing of the query input to the original calling application in conjunction with the query module 203. Still further, when the returned data set is comprised of streaming data, additional state information regarding the stream and its current state of progress or computation is indicated.

The query engine 107 can access local data stores by way of a communication module 209, an executable module for facilitating data exchange and communication over a network 105. By way of example, the communication network 105 of system 100 includes one or more networks such as a data network (not shown), a wireless network (not shown), a telephony network (not shown) or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the UE 101 can support any type of interface to the user (such as "wearable" circuitry, etc.).

By way of example, the UE 101, the query engine 107a and the content provider 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Even in instances where the device seeks to access a centralized database in response to a query rather than a distributed framework, the ability for the querying application to employ a cursor for quickly traversing the resulting data set is limited, especially in instances where the data set is large.

Attention is now turned to FIG. 4, which illustrates a flowchart of a process 400 for supporting querying of data sets distributed over one or more databases, according to one embodiment. In a first step 401, the query module 203 operates in conjunction with the distribution module 205a to select at least a first and second data set on which to apply a query. The first and the second data set may be a primary and sub data set, located at different databases, individual data sets of a single database, etc. In response to the query request, the cursor generator 205b generates a first cursor based, at least in part, on a first application of the query on the first data set. In addition, the cursor generator 205b generates a second cursor based, at least in part, on a second application of the query on the second data set. The preceding steps correspond to step 403. As a final step 405, having generated respective cursors for enabling traversal of the data sets, a third cursor is generated by the result set compiler 205d representing a combined result set for the query. While process 400 depicts a general high-level approach to enabling query resolution respective to distributed data sets and/or databases, FIGS. 5A-5F present specific processing schemes.

Figure 5B:
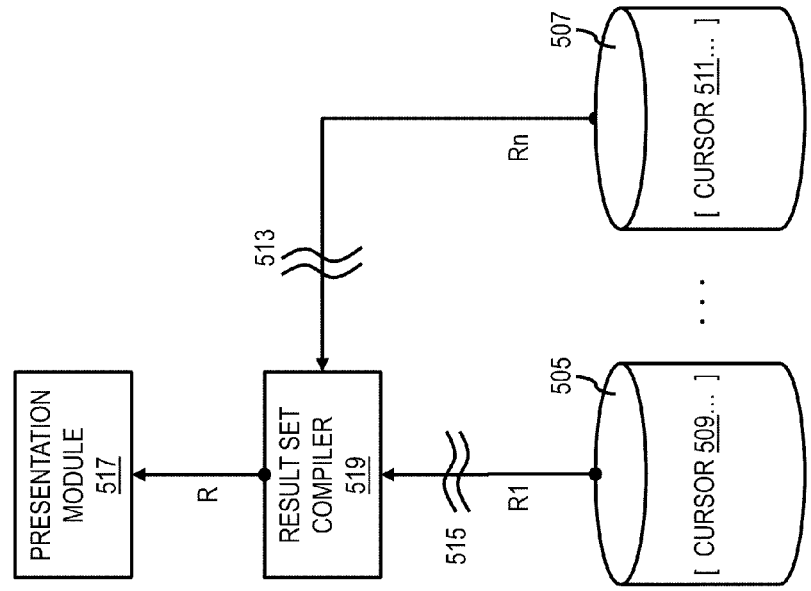
FIGS. 5A-5F are diagrams of query processing schemes for supporting querying of data sets distributed over one or more databases, according to various embodiments.
Figure 5A:
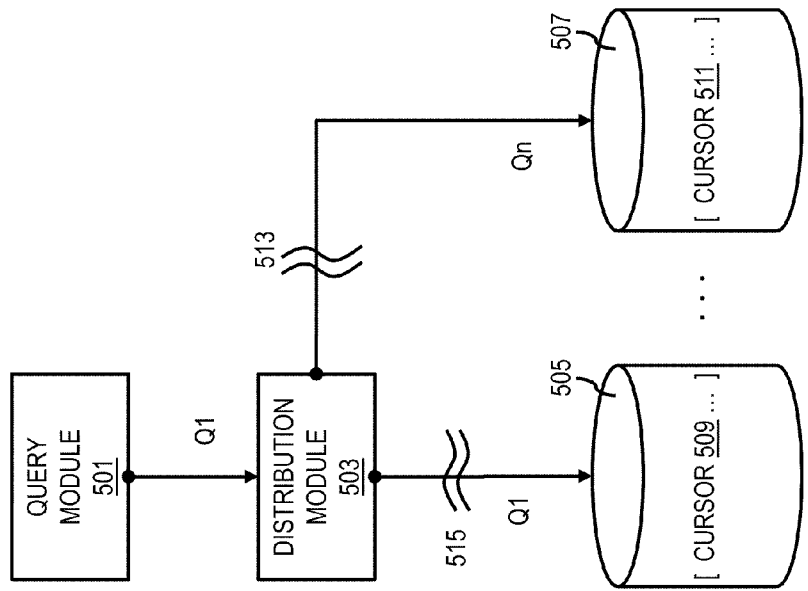

Specifically, FIGS. 5A-5F are diagrams of query processing schemes for supporting querying of data sets distributed over one or more databases, according to various embodiments. In FIG. 5A, the basic query distribution process 500 performed by a distribution module 503 is shown. The distribution module 503 responds to a query Q1 generated by the query module 501 by modifying and/or distributing it as queries Q1 to Qn corresponding to databases 505 and 507 respectively. Depending on the location of respective databases 505 and 507 as well as data types to be processed—i.e., external/remote data, local data held or cached data—the query distribution is facilitated by way of network interfaces 513 and 515. One or more cursors 509 and 511 respectively are spawned by the cursor generator (not shown) for processing the data sets 505 and 507 accordingly. The one or more cursors are generated based, at least in part, on the determined data types or respective query result sets.

FIG. 5B depicts the basic query result set return process 516, responsive to the distribution scheme of FIG. 5A. The results from queries Q1 to Qn are returned by cursors 509 and 511 as results R1 to Rn respectively, where n represents the total number of databases, data sets or queries. Individual cursor results 509 and 511 are then returned to the result set compiler 519 and eventually to the presentation module 517 for enabling display in conjunction with the query module 501.

Figure 5D:
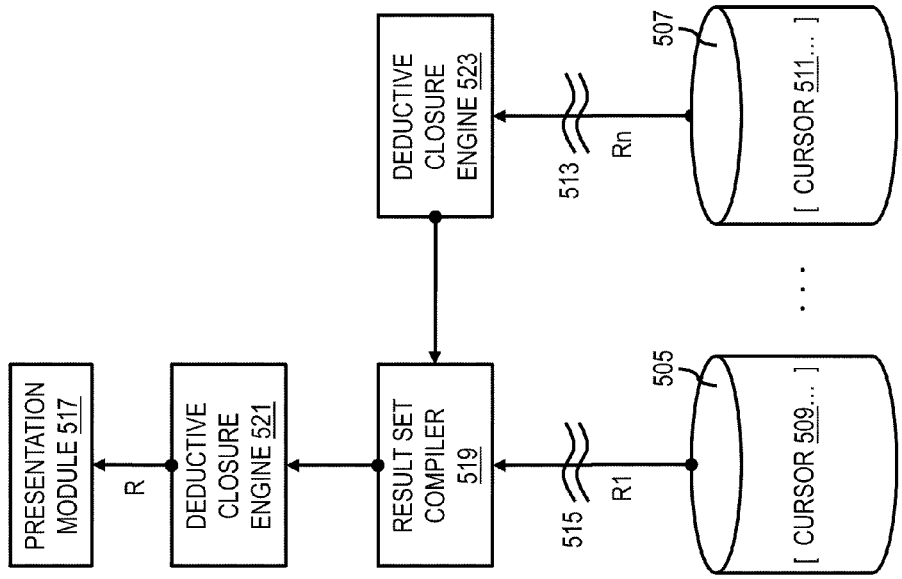
Figure 5C:
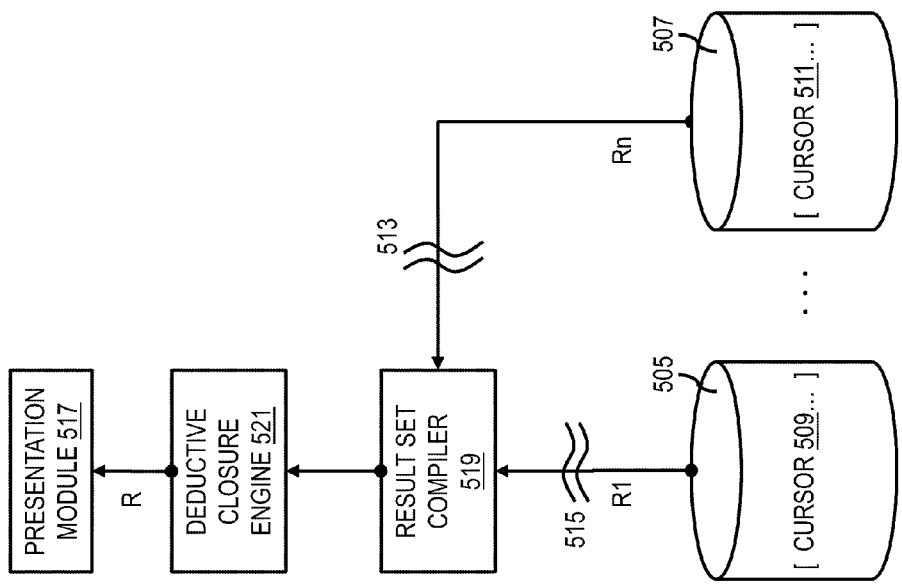

FIG. 5C depicts the query result set return process 520 for execution of deductive closure processing. In the case where deductive closure is involved, the result set compiler 519 passes the result set to a deductive closure engine 521. The output result R from the deductive closure engine 521 is then passed on to the presentation module 517 for enabling display in conjunction with the query module 501. Pursuant to this scheme, result sets R1 through Rn are stored as before inside the MRC Cursor. As such, each computation of the deductive closure requires a separate thread of execution. The relationship between result sets and the distributed deductive closure function is as follows:

D(R1)
D(R2)
D(R1∪R2)

D represents the distributed closure function, which if further represented as a function of a given result set R1, R2 or a union thereof.

FIG. 5D depicts the query result set return process 530 for execution of deductive closure processing on result sets individually as opposed to a combined result set. The scheme is similar to that of 5C except that individual cursor 511 result set Rn is processed by a deductive closure engine 523 prior to being passed along to the result set compiler 519. This processing scheme is applicable when computation of the deductive closure is made off of the device, i.e., by a third party application, or when performed in a distributed fashion. Each computation of the deductive closure 521 and 523 requires a separate thread of execution. The relationship between result sets and the distributed deductive closure function is as follows:

DL(R1)
DR(R2)
DL(R1∪R2)
DL(R1∪DR(R2))
DL(DL(R1)∪DR(R2))

The subscripts associated with a deductive closure relation D denotes whether the computation is performed locally to the query module or remotely by a deductive closure engine, corresponding to subscripts L and R respectively. Generally, $D_L$ and $D_R$ are functionally equivalent such that DL(X)=DR (X). However, this relationship is not true in all cases, particularly when a larger set of more complex rules are presented at the remote database. Indeed, the above relationships are not complete in all the possible combinations. FIG. 5E depicts the query result set return process 540 for execution of deductive closure processing on result sets stored locally, remotely or in temporary datastore (e.g., cache). In this scheme, at least one database 505 maintains cache storage 505a. For the one embodiment, a division between two devices engaged in the distribution process is contemplated such as the database on a first device caches information it receives from a second device. The first device, corresponding to the first database 505 caches the information as 505a in addition to maintaining local data sets. Constraints associated with this functional relationship are as follows:

Database 507 is distributed data (System of Record)
Data set 505a is cached data such that $C \subseteq S$
Other data within Database 505 is local data 505b The relationship between result sets and the distributed deductive closure function is as follows:

Result sets are constructed from 505b only, 505b and 505a, 505a only, 507 only, 507 and 505b as well as the various combinations of deductive closure over these results as discussed before. In some instances, the cache 505a contains state or status information. The state or status information may include, but is not limited to, data indicating whether or not the distributed database 507 has been updated or synchronized with data set 505a, a query completion status, an amount of data responsive to the query, an extent of available data, a completion time, an error resulting from lack of data access or availability, etc.

Figure 5F:
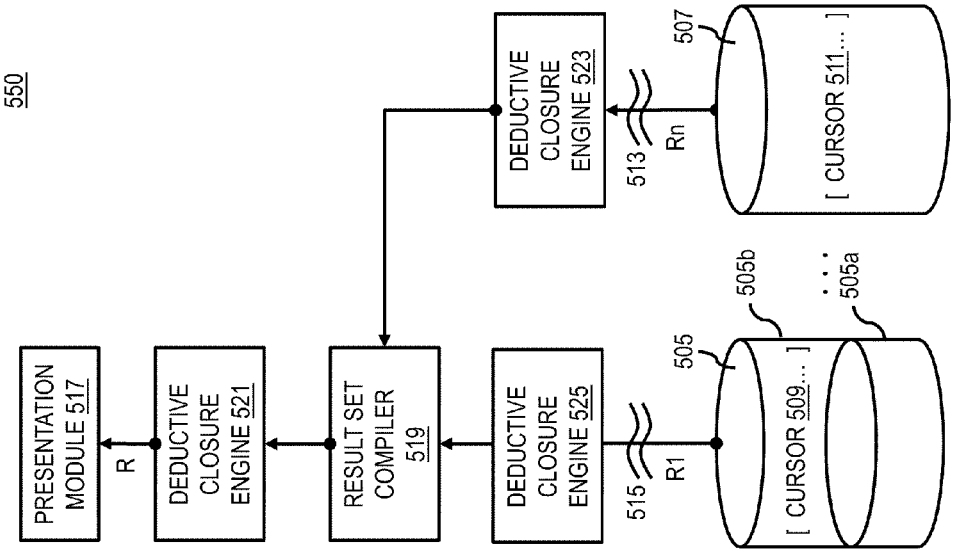
Figure 5E:
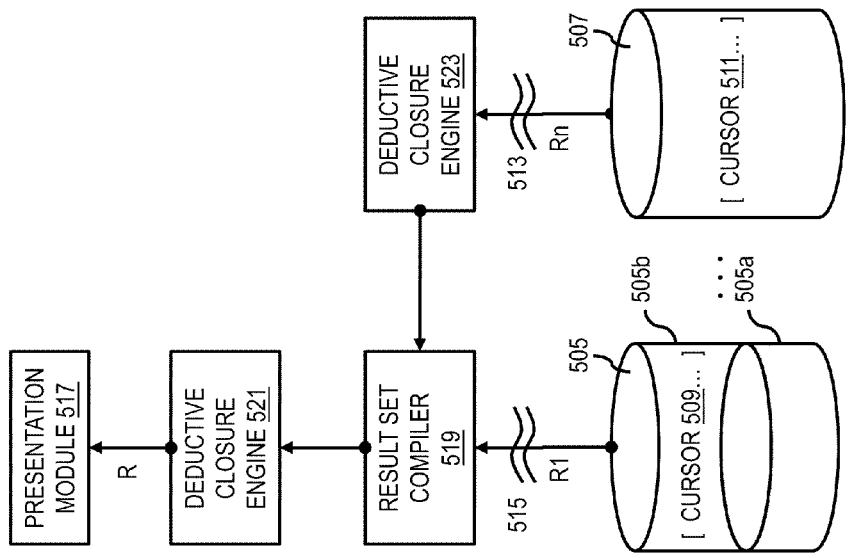

FIG. 5F is process 550 relatively identical to that of FIG. 5E, with the exception that a deductive closure engine 525 operates upon both result sets R1 through Rn prior to processing by the result set compiler 519. This approach serves as a further optimization through placement of a deductive closure engine 525 between the distribution module and any local data store 505b. For larger datasets and subsets, this can further reduce query processing time by enabling deductive computation to be performed dataset by dataset as opposed to on the combination thereof.

Figure 6:
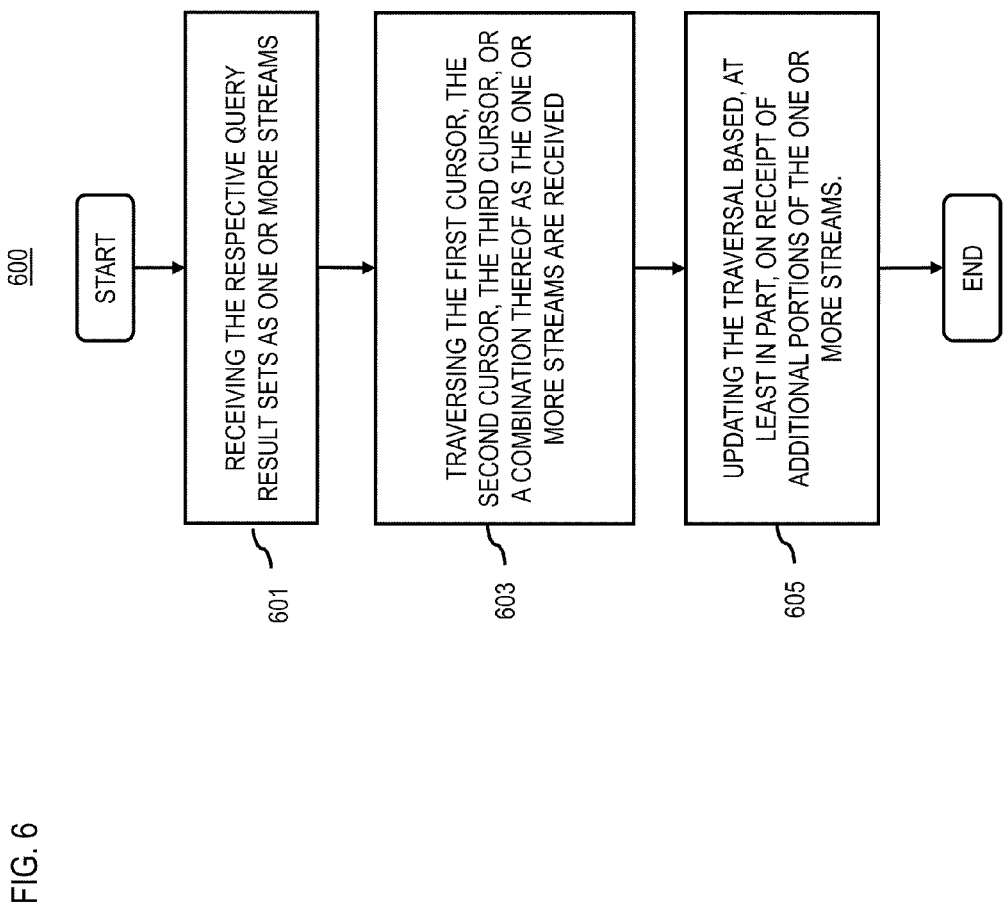
FIG. 6 is a flowchart depicting a process for updating a data stream based on querying of data sets distributed over one or more databases, according to various embodiments.

FIG. 6 is a flowchart depicting a process 600 for updating a data stream based on querying of data sets distributed over one or more databases, according to various embodiments. As streaming data is best viewed in continuous fashion, this process enables continuity to be maintained respective to the query process. In a first step 601, the result set compiler receives the respective query result sets as one or more data streams of interest. The cursors associated with the returned data streams are traversed as the streams are received. Hence, this real-time process enables the respective cursors to still operate upon the data sets. This corresponds to step 603. As a final step 605, the traversal process is updated based at least in part on receipt of additional portions of the data streams. Resultantly, an effective means for consistently updating data streams achieved.

In particular when using free-form databases, retrieval of streaming data with respect to a result set becomes necessary. In the case of streaming data, results are continuously returned to the requesting agent, either because of size or because of continuous data caching. When this is the case, the MRC cursor can report the status of the computation and of the data streaming session, the latter in terms of amount of streamed results, rate, expected results, time elapsed, CODEC rate, etc. Such calculations or status information can be determined for each cursor associated with a streaming data set or as a whole for the MRC Cursor.

It is also noted that transmission errors can be reported using the same mechanisms where one or more result sets can fail because of various reasons (e.g., due to networking failure) without compromising the validity of MRC cursor as a whole. For applications or agents using the MRC cursor implementation, this enables a degree of fault-tolerance. Still further, it is noted that result set overlapping can be accounted for by the MRC cursor implementation herein. Detection of overlapping results sets as a result of cursors of the MRC cursor can be used to coalesce results such that memory allocation and computation time is reduced.

The processes described herein for providing result cursors associated with a query request to traverse data sets distributed over one or more databases may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
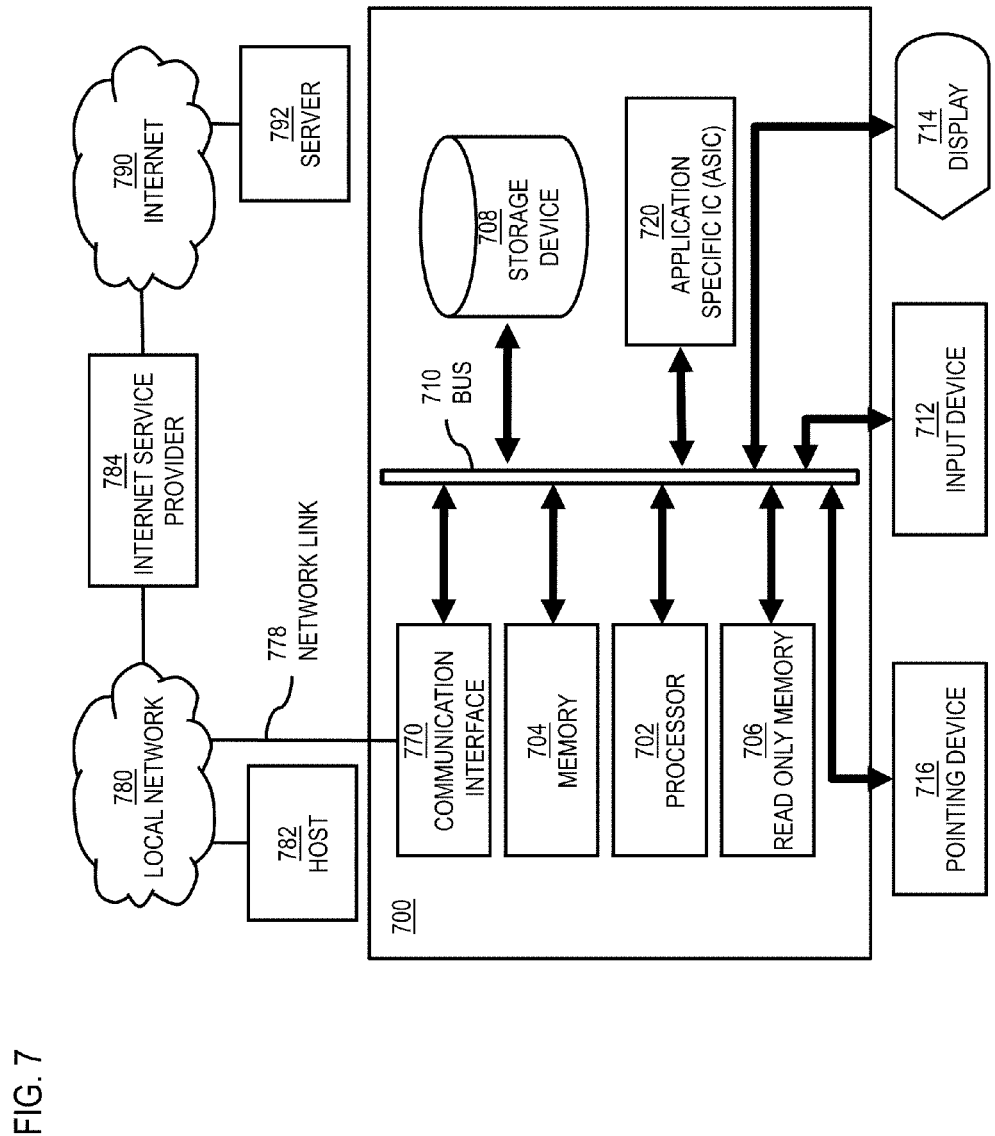
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to enable result cursors associated with a query request to traverse data sets distributed over one or more databases as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of enabling result cursors associated with a query request to traverse data sets distributed over one or more databases.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to enabling result cursors associated with a query request to traverse data sets distributed over one or more databases. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for enabling result cursors associated with a query request to traverse data sets distributed over one or more databases. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for enabling result cursors associated with a query request to traverse data sets distributed over one or more databases, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for enabling result cursors associated with a query request to traverse data sets distributed over one or more databases to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

Figure 8:
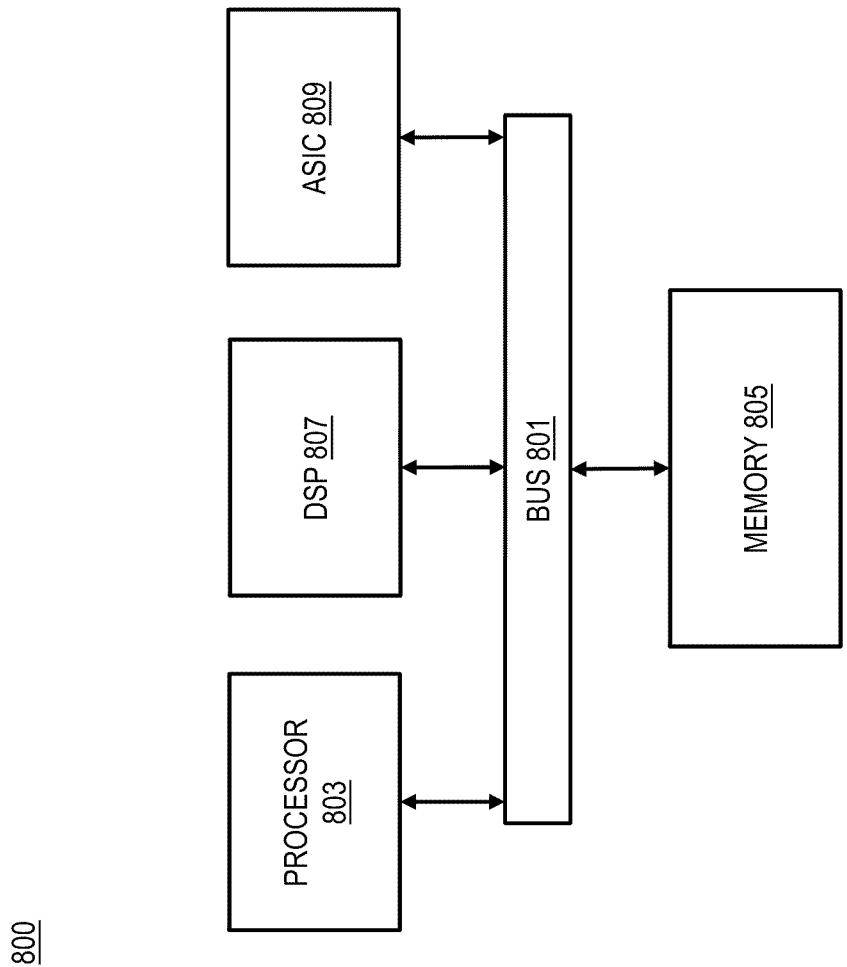
FIG. 8 is a diagram of a chip set that can be used to implement an embodiment of the invention.

FIG. 8 illustrates a chip set or chip 800 upon which an embodiment of the invention may be implemented. Chip set 800 is programmed to enable result cursors associated with a query request to traverse data sets distributed over one or more databases as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of services. Chip set or chip 800, or a portion thereof, constitutes a means for performing one or more steps of enabling result cursors associated with a query request to traverse data sets distributed over one or more databases.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to enable result cursors associated with a query request to traverse data sets distributed over one or more databases. The memory 805 also stores the data associated with or generated by the execution of the inventive steps.

Figure 9:
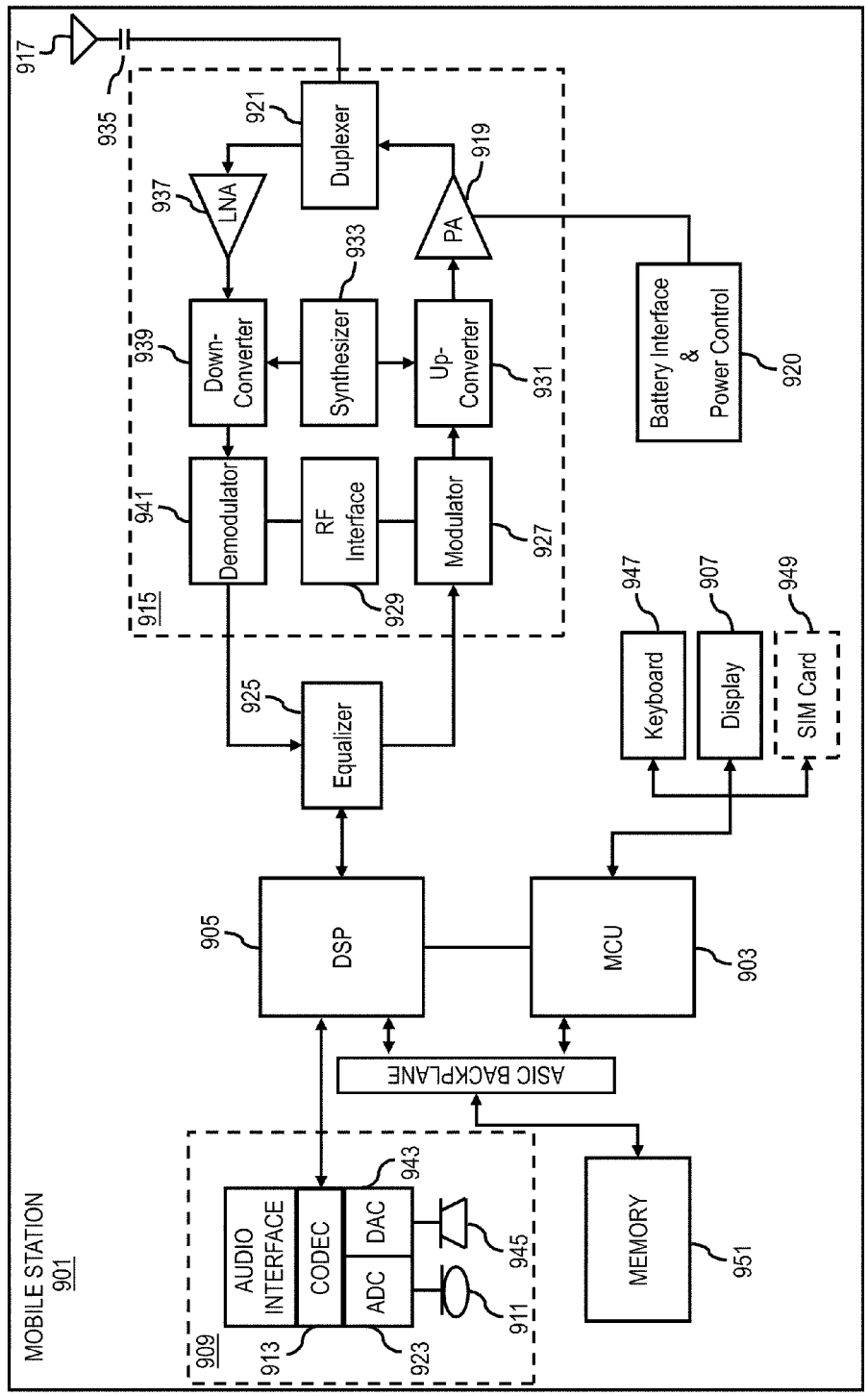
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 900, or a portion thereof, constitutes a means for performing one or more steps of enabling result cursors associated with a query request to traverse data sets distributed over one or more databases. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of enabling result cursors associated with a query request to traverse data sets distributed over one or more databases. The display 9 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to enable result cursors associated with a query request to traverse data sets distributed over one or more databases. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
selecting at least a first data set and a second data set within a distributed database environment on which to apply a query, wherein the first data set, the second data set, or a combination thereof comprise data types including local data, cached local data, remote data, cached remote data, or a combination thereof;
generating a first cursor based, at least in part, on a first application of the query on the first data set;
generating a second cursor based, at least in part, on a second application of the query on the second data set, wherein the first cursor and the second cursor point to respective query result sets within the first data set and the second data set;
determining the data types of the respective query result sets;
generating a third cursor based, at least in part, on the first cursor and the second cursor, wherein the third cursor represents a combined result set for the query, the first cursor, the second cursor, the third cursor, or a combination thereof is further based on the determined data types of the respective query result sets;
causing, at least in part, modification of the query based, at least in part, on one or more characteristics of the first data set, the second data set, or a combination thereof, wherein the first application of the query, the second application of the query, or a combination thereof is further based on the modification and the modification includes distributing the query into separate individual queries for use concurrently amongst the first data set, the second data set, or a combination thereof;
applying at least two deductive closures over the respective query result sets or the combined results set to generate a final result set, wherein each application of the at least two deductive closures requires a separate thread of execution performed at least one of (i) locally to the query or (ii) by a deductive closure engine; and
causing to present the final result set.

2. A method of claim 1, further comprising:
causing, at least in part, modification of the query based, at least in part, on the data types of the first data set, the second data set, or a combination thereof,
wherein the first application of the query, the second application of the query, or a combination thereof is further based on the modification of the query based, at least in part, on the data types of the first data set, the second data set, or a combination thereof.

3. A method of claim 1, further comprising:
applying the one or more deductive closures over the respective query result sets,
wherein the generating of the first cursor, the second cursor, the third cursor, or a combination thereof is further based on the one or more deductive closures.

4. A method of claim 1, further comprising:
receiving the respective query result sets in real-time as one or more streams;
causing, at least in part, traversal of the first cursor, the second cursor, the third cursor, or a combination thereof as the one or more streams are received; and
updating the traversal based, at least in part, on receipt of additional portions of the one or more streams.

5. A method of claim 1, further comprising:
detecting overlap among the respective query result sets, wherein the generating of the third cursor further comprises compacting the respective result sets associated with the third cursor based, at least in part, on the overlap.

6. A method of claim 1, further comprising:
selecting a third data set on which to apply the query; and
causing, at least in part, generating of a fourth cursor based, at least in part, on a third application of the query on the third data set, the fourth cursor pointing to the respective query results sets within the third data set, wherein the generating of the third cursor is further based on the fourth cursor.

7. An apparatus comprising:
at least one processor; and
at least one memory including computer program code, wherein the at least one memory and the computer program code are configured to, with the at least one processor, cause the apparatus to perform at least the following:
select at least a first data set and a second data set within a distributed database environment on which to apply a query, wherein the first data set, the second data set, or a combination thereof comprise data types including local data, cached local data, remote data, cached remote data, or a combination thereof;
generate a first cursor based, at least in part, on a first application of the query on the first data set;
generate a second cursor based, at least in part, on a second application of the query on the second data set, wherein the first cursor and the second cursor point to respective query result sets within the first data set and the second data set;
determine the data types of the respective query result sets;
generate a third cursor based, at least in part, on the first cursor and the second cursor, wherein the third cursor represents a combined result set for the query, the first cursor, the second cursor, the third cursor, or a combination thereof is further based on the determined data types of the respective query result sets;
cause, at least in part, modification of the query based, at least in part, on one or more characteristics of the first data set, the second data set, or a combination thereof, wherein the first application of the query, the second application of the query, or a combination thereof is further based on the modification and the modification includes distributing the query into separate individual queries for use concurrently amongst the first data set, the second data set, or a combination thereof;
apply at least two deductive closures over the respective query result sets or the combined results set to generate a final result set, wherein each application of the at least two deductive closures requires a separate thread of execution performed at least one of (i) locally to the query or (ii) by a deductive closure engine; and
cause to present the final result set.

8. An apparatus of claim 7, wherein the apparatus is further caused to:
cause, at least in part, modification of the query based, at least in part, on the data types of the first data set, the second data set, or a combination thereof,
wherein the first application of the query, the second application of the query, or a combination thereof is further based on the modification of the query based, at least in part, on the data types of the first data set, the second data set, or a combination thereof.

9. An apparatus of claim 7, wherein the apparatus is further caused to:
apply the one or more deductive closures over the respective query result sets,
wherein the generating of the first cursor, the second cursor, the third cursor, or a combination thereof is further based on the one or more deductive closures.

10. An apparatus of claim 7, wherein the apparatus is further caused to:
receive the respective query result sets in real-time as one or more streams;
cause, at least in part, traversal of the first cursor, the second cursor, the third cursor, or a combination thereof as the one or more streams are received; and
update the traversal based, at least in part, on receipt of additional portions of the one or more streams.

11. An apparatus of claim 7, wherein the apparatus is further caused to:
detect overlap among the respective query result sets,
wherein the generating of the third cursor further comprises compacting the respective result sets associated with the third cursor based, at least in part, on the overlap.

12. An apparatus of claim 7, wherein the apparatus is further caused to:
select a third data set on which to apply the query; and
cause, at least in part, generating of a fourth cursor based, at least in part, on a third application of the query on the third data set, the fourth cursor pointing to the respective query results sets within the third data set,
wherein the generating of the third cursor is further based on the fourth cursor.

13. A non-transitory computer-readable storage medium carrying one or more sequences of one or more instructions which, when executed by one or more processors, cause an apparatus to perform at least the following:
selecting at least a first data set and a second data set within a distributed database environment on which to apply a query, wherein the first data set, the second data set, or a combination thereof comprise data types including local data, cached local data, remote data, cached remote data, or a combination thereof;
generating a first cursor based, at least in part, on a first application of the query on the first data set;
generating a second cursor based, at least in part, on a second application of the query on the second data set, wherein the first cursor and the second cursor point to respective query result sets within the first data set and the second data set;
determining the data types of the respective query result sets;
generating a third cursor based, at least in part, on the first cursor and the second cursor, wherein the third cursor represents a combined result set for the query, the first cursor, the second cursor, the third cursor, or a combination thereof is further based on the determined data types of the respective query result sets;
causing, at least in part, modification of the query based, at least in part, on one or more characteristics of the first data set, the second data set, or a combination thereof, wherein the first application of the query, the second application of the query, or a combination thereof is further based on the modification and the modification includes distributing the query into separate individual queries for use concurrently amongst the first data set, the second data set, or a combination thereof;
applying at least two deductive closures over the respective query result sets or the combined results set to generate a final result set, wherein each application of the at least two deductive closures requires a separate thread of execution performed at least one of (i) locally to the query or (ii) by a deductive closure engine; and
causing to present the final result set.

14. A non-transitory computer-readable storage medium of claim 13, wherein the apparatus is caused to further perform:
causing, at least in part, modification of the query based, at least in part, on the data types of the first data set, the second data set, or a combination thereof,
wherein the first application of the query, the second application of the query, or a combination thereof is further based on the modification of the query based, at least in part, on the data types of the first data set, the second data set, or a combination thereof.

15. The method of claim 1, wherein the final result set is based on common or fundamental characteristics amongst the respective query result sets or the combined results.

16. The method of claim 1, further comprising:
determining status information with respect to the first application, the second application, or a combination thereof, wherein the status information provides information about the respective query result sets or the combined results set, said information comprising whether the respective query result sets or the combined results set is complete relative to query constraints, an amount of data of the result set responsive to the query, an extent of available data, a completion time, an error resulting from lack of data access or availability, or a combination thereof; and
associating the status information of the respective query result sets or the combined results set with the first cursor, the second cursor, the third cursor, or a combination thereof.

17. The apparatus of claim 7, wherein the final result set is based on common or fundamental characteristics amongst the respective query result sets or the combined results.

18. The apparatus of claim 7, wherein the apparatus is further caused to:
determine status information with respect to the first application, the second application, or a combination thereof, wherein the status information provides information about the respective query result sets or the combined results set, said information comprising whether the respective query result sets or the combined results set is complete relative to query constraints, an amount of data of the result set responsive to the query, an extent of available data, a completion time, an error resulting from lack of data access or availability, or a combination thereof; and
associate the status information of the respective query result sets or the combined results set with the first cursor, the second cursor, the third cursor, or a combination thereof.

* * * * *